United States Patent [19]

Hauck et al.

[11] Patent Number: 5,649,088
[45] Date of Patent: Jul. 15, 1997

[54] SYSTEM AND METHOD FOR RECORDING SUFFICIENT DATA FROM PARALLEL EXECUTION STAGES IN A CENTRAL PROCESSING UNIT FOR COMPLETE FAULT RECOVERY

[75] Inventors: Richard Stephen Hauck, St. Charles; David Arthur Welch, Bristol; Michael James Will, Naperville, all of Ill.

[73] Assignee: Lucent Technologies Inc., Murray Hill, N.J.

[21] Appl. No.: 695,543

[22] Filed: Aug. 12, 1996

Related U.S. Application Data

[63] Continuation of Ser. No. 346,155, Dec. 27, 1994, abandoned.

[51] Int. Cl.$^6$ .................................................. G07F 11/00
[52] U.S. Cl. ................................... 395/181; 364/231.8
[58] Field of Search ............................. 395/181, 182.13, 395/375, 800, 182.07; 364/231.8, 948.34

[56] References Cited

U.S. PATENT DOCUMENTS

| 4,760,519 | 7/1988 | Papworth et al. | 364/231.8 |
| 4,805,095 | 2/1989 | Armstrong et al. | 364/200 |
| 4,875,160 | 10/1989 | Brown, III | 364/231.8 |
| 5,193,181 | 3/1993 | Barlow et al. | 364/231.8 |
| 5,297,263 | 3/1994 | Ohtsuka et al. | 364/231.8 |
| 5,504,925 | 4/1996 | Jeffs | 395/800 |

OTHER PUBLICATIONS

"Implementing Precise Interrupts in Pipelined Processors," *IEEE Transactions on Computers*, vol. 37, No. 5, May 1988, pp. 562,573, J. E. Smith, et al.

"The Interaction of Architecture and Operating System Design," ASPLOS–IV Proceedings: Fourth International Conference on Architectural Support for Programming Languages and Operating Systems, Santa Clara, CA, Apr. 8–11, 1991, T. E. Anderson, et al. (Dept. of Computer Science and Engineering—Univ. of Washington, Seattle, WA 98195.

*Primary Examiner*—Robert W. Beausoliel, Jr.
*Assistant Examiner*—Trinh L. Tu
*Attorney, Agent, or Firm*—Michael B. Johannesen

[57] ABSTRACT

A fault recovery system and method that deterministically reconstructs the instruction stream of a multiple execution stage ("pipelined") processor. A log ("queue") is provided for each critical data item to record the instructions, operations and effects as processing proceeds. Also, rather than merely freezing the execution of a specific stage upon occurrence of a fault, all stages are stopped so that each stage does not overwrite log information that is needed to reconstruct the instruction flow immediately preceding the invocation of any fault recovery operation. The fault recovery operation may then serially reconstruct the instruction flow, advantageously starting with the instruction where the fault occurred, working to reconstruct from that instruction to the last instruction that was executing before the fault recovery operation began.

3 Claims, 15 Drawing Sheets

| STATE | PIPELINE EVENT | DESCRIPTION |
|---|---|---|
| 000 | NO ACTION | NOTHING HAPPENED DURING THIS CLOCK CYCLE. THE PIPELINE MAY BE EMPTY OR AN INSTRUCTIION IS STALLED IN E2. THE INSTRUCTION IN INDEXING COULD BE BLOCKED WAITING FOR ANOTHER CONDITION TO CLEAR OR WE COULD BE WAITING FOR AN INSTRUCTION FETCH TO PROVIDE AN INSTRUCTION TO INDEXING. |
| 002 | IX → E1 | THE INSTRUCTION IN INDEXING WAS LOADED INTO E1 SINCE E2 IS NOT AVAILABLE. |
| 004 | EMPTY → E2 | THE INSTRUCTION IN E2 HAS COMPLETED, BUT THERE IS NO INSTRUCTION IN EITHER E1 OR IX TO EXECUTE, SO THE EMPTY WORD IS CLOCKED INTO E2. |
| 005 | IX → E2 | THE INSTRUCTION IN INDEXING WAS LOADED INTO E2. |
| 007 | IX → E2,E1 | THE INSTRUCTION IN INDEXING REQUIRES BOTH E1 AND E2 AND IS LOADED INTO BOTH E1 AND E2. |
| 010 | NO ACTION | THERE IS AN INSTRUCTION IN BOTH E1 AND E2, BUT THE INSTRUCTION IN E2 IS NOT COMPLETED YET. |
| 014 | E1 → E2, EMPTY → E1 | THE INSTRUCTION IN E2 IS COMPLETE, SO E1 MOVES TO E2. NO INSTRUCTION IS READY TO LEAVE INDEXING, SO THE "EMPTY" WORD IS LOADED INTO E1. |
| 016 | E1 → E2, IX → E1 | THE INSTRUCTION IN E2 IS COMPLETE, SO E1 MOVES TO E2. THE INSTRUCTION IN INDEXING WAS LOADED INTO E1. |

*FIG. 7*

| SAVED DATA ADDRESS QUEUE DATA LAYOUT ||
|---|---|
| BITS | DEFINITION |
| 29 – 00 | SAVED DATA ADDRESS |
| 31 – 30 | 00 = PULSE OR STACK OPERATION<br>01 = READ OPERATION<br>10 = WRITE OPERATION<br>11 = DIAGNOSTIC LOOP AROUND OPERATION |

FIG. 8

| CURRENT ADDRESS QUEUE DATA LAYOUT ||
|---|---|
| BITS | DEFINITION |
| 29 – 00 | SAVED CURRENT ADDRESS |
| 30 | IF SET, INSTRUCTION NEEDED EXECUTION PHASE 2 726 |
| 31 | IF SET, INSTRUCTION NEEDED EXECUTION PHASE 1 724 |

FIG. 9

| EXECUTION PIPELINE HISTORY QUEUE DATA LAYOUT ||
|---|---|
| BITS | DEFINITION |
| 00 | IF SET, INSTRUCTION INDEX 722 WILL GATE INSTRUCTION TO EXECUTION PHASE 1 724 |
| 01 | IF SET, INSTRUCTION INDEX 722 WILL GATE INSTRUCTION TO EXECUTION PHASE 2 726 |
| 02 | IF SET, EXECUTION PHASE 2 726 WILL BE GATED FROM EITHER INSTRUCTION INDEX 722 OR EXECUTION PHASE 1 724 |
| 03 | IF SET, EXECUTION PHASE 1 724 CONTAINED A VALID INSTRUCTION |
| 15 – 08 | SAVED VALUE OF CURRENT ADDRESS QUEUE POINTER FROM TIME OF FAULT |
| 23 – 16 | CURRENT VALUE OF CURRENT ADDRESS QUEUE POINTER |

FIG. 10

| ENTRY | SAVED CURRENT ADDRESS | SAVED DATA ADDRESS | EXECUTION PIPELINE HISTORY | POINTER | STATE |
|---|---|---|---|---|---|
| 0 | 17777701270 | 27754000000 | 12417405 | 4 | 5 |
| 17 | 27777701367 | 17740000000 | 12425014 | 17 | 14 |
| 16 | 27777701365 | 17740000000 | 12425016 | 17 | 16 |
| 15 | 17777701363 | 17750000000 | 12424402 | 16 | 2 |
| 14 | 7777701361 | 17743777777 | 12424005 | 15 | 5 |
| 13 | 7777701357 | 7740010101 | 12423400 | 14 | 0 |
| 12 | 17777701355 | 7740010101 | 12423000 | 13 | 0 |
| 11 | 17777701354 | 27740000000 | 12422404 | 12 | 4 |
| 10 | 17777701353 | 27740000000 | 12422405 | 12 | 5 |
| 7 | 7777701303 | 27757777777 | 12422004 | 11 | 4 |
| 6 | 17777701301 | 27757777777 | 12422005 | 11 | 5 |
| 5 | 17777701300 | 27757777777 | 12421405 | 10 | 5 |
| 4 | 17777701276 | 27757777777 | 12421004 | 7 | 4 |
| 3 | 17777701275 | 27757777777 | 12420405 | 6 | 5 |
| 2 | 17777701273 | 27754000000 | 12420004 | 5 | 4 |
| 1 | 17777701272 | 27754000000 | 12420005 | 5 | 5 |

*FIG. 11*

| STATE TRANSITION | DESCRIPTION |
|---|---|
| 2 → 16 → {14,16} | STATE 2 IS FOLLOWED BY STATE 16 AND THEN BY ANOTHER STATE 14 OR 16. |
| 2 → 14 → {4,5,7,16} | STATE 2 IS FOLLOWED BY STATE 14 AND THEN BY EITHER STATE 4, 5, 7 OR 16.<br>NOTE: STATE 14 COULD BE FOLLOWED BY STATE 2 BUT THE INSTRUCTION WOULD NOT BE COMPLETE UNTIL A SUBSEQUENT STATE 16. |
| 5 → {4,5,7,14,16} | STATE 5 IS FOLLOWED BY EITHER STATE 4, 5, 7, 14 OR 16. STATE 14 WOULD HAVE TO GO THROUGH STATE 2 TO REACH STATE 16. |
| 7 → 14 → {4,5,7,16} | STATE 7 MUST BE FOLLOWED BY STATE 14 AND THEN BY A STATE 4, 5, 7 OR 16. |
| 7 → 16 → {14,16} | STATE 7 FOLLOWED BY STATE 16 MUST BE FOLLOWED BY A STATE 14 OR 16 TO BE COMPLETE. |
| 16 → 14 → {4,5,7,16} | STATE 16 IS FOLLOWED BY STATE 14 AND THEN BY ONE OF THE E2 COMPLETION STATES 4, 5 OR 7, OR, THROUGH STATE 2, BY STATE 16. |
| 16 → 16 → {14,16} | STATE 16 IS FOLLOWED BY STATE 16 AND THEN BY ONE OF THE E2 COMPLETION STATES 14 OR STATE 16. |
| IX_only → {2,5,7,16,IX_only} | AN INDEX-ONLY INSTRUCTION IS COMPLETE WHEN ANOTHER INSTRUCTION ENTERS INDEXING. THIS IS EXHIBITED BY A STATE 2, 5, 7, 16 OR ANOTHER SCA WITH NO D-BITS SET. |

*FIG. 12*

| DATA NODE ADDRESS DATA LAYOUT ||
|---|---|
| BITS | DEFINITION |
| 29 – 00 | SAVED DATA NODE ADDRESS QUEUE ENTRY |
| 30 | IF SET, ACCESS TYPE WAS "READ" |
| 31 | SAVED PARITY ON LINES RUNNING FROM CPU PIPELINE 718 TO BUS NODE ARBITER 704 FOR DATA NODE |

FIG. 13

| INDEX NODE ADDRESS QUEUE DATA LAYOUT ||
|---|---|
| BITS | DEFINITION |
| 29 – 00 | SAVED INDEX NODE ADDRESS QUEUE ENTRY |
| 30 | IF SET, ACCESS TYPE WAS "READ" |
| 31 | SAVED PARITY ON LINES RUNNING FROM CPU PIPELINE 718 TO BUS NODE ARBITER 704 FOR INDEX NODE |

FIG. 14

| FETCH NODE ADDRESS QUEUE DATA LAYOUT ||
|---|---|
| BITS | DEFINITION |
| 23 – 00 | SAVED FETCH NODE ADDRESS QUEUE ENTRY |

FIG. 15

| PORT MAPPING QUEUE DATA LAYOUT | |
|---|---|
| BITS | DEFINITION |
| 00 | IF SET, MAINTENANCE REGISTER ACCESS FROM INDEX PORT |
| 01 | IF SET, PROGRAM STORE 708 ACCESS FROM FETCH PORT |
| 02 | IF SET, PROGRAM STORE 708 ACCESS FROM INDEX PORT |
| 03 | IF SET, PROGRAM STORE 708 ACCESS FROM DATA PORT |
| 04 | IF SET, MAINTENANCE REGISTER ACCESS FROM DATA PORT |
| 05 | IF SET, CALL STORE 710 ACCESS FROM FETCH PORT |
| 06 | IF SET, CALL STORE 710 ACCESS FROM INDEX PORT |
| 07 | IF SET, CALL STORE 710 ACCESS FROM DATA PORT |
| 00 | IF SET, OUTGOING ACCESS TO DMA MANAGER 712 |
| 01 | IF SET, READ-ONLY PROGRAM STORE 708 ACCESS FROM FETCH PORT |
| 02 | IF SET, READ-ONLY PROGRAM STORE 708 ACCESS FROM INDEX PORT |
| 03 | IF SET, READ-ONLY PROGRAM STORE 708 ACCESS FROM DATA PORT |

(Rows 00–07 grouped as B; rows 00–03 grouped as A)

*FIG. 16*

| CONTROL QUEUE DATA LAYOUT | |
|---|---|
| BITS | DEFINITION |
| 00 | STATE OF WRITE LINE FROM DATA PORT |
| 01 | STATE OF MAINTENANCE LINE FROM DATA PORT |
| 02 | STATE OF CONTROL LINE FROM DATA PORT |
| 03 | STATE OF PULSE LINE FROM DATA PORT |
| 04 | STATE OF CONTROL LINE FROM INDEX PORT |
| 05 | STATE OF REQUEST LINE FROM DATA PORT |
| 07 | IF SET, DATA PORT GRANTED ACCESS TO DMA MANAGER 712 |

*FIG. 17*

| ERROR AND STATUS QUEUE DATA LAYOUT ||
|---|---|
| BITS | DEFINITION |
| 00 | IF SET, DATA, INDEX OR FETCH PORT REQUESTED ADDRESS CONSIDERED OUT-OF-RANGE |
| 01 | IF SET, FETCH PORT DETECTED BAD PARITY ON RECEIVED DATA |
| 02 | STATE OF ALL-SEEMS-WELL-FAILURE SIGNAL FROM MEMORY 706 FOR ACCESSES FROM FETCH PORT |
| 03 | STATE OF ALL-SEEMS-WELL SIGNAL FROM MEMORY 706 FOR ACCESSES FROM FETCH PORT |
| 04 | IF SET, DATA PORT DETECTED BAD PARITY ON RECEIVED DATA |
| 05 | STATE OF WRITE-DATA-PARITY-FAILURE FROM MEMORY 706 FOR ACCESSES FROM DATA OR INDEX PORT |
| 06 | STATE OF ALL-SEEMS-WELL-FAILURE SIGNAL FROM MEMORY 706 FOR ACCESSES FROM DATA OR INDEX PORT |
| 07 | STATE OF ALL-SEEMS-WELL SIGNAL FROM MEMORY 706 FOR ACCESSES FROM DATA OR INDEX PORT |

*FIG. 18*

| ENTRY | DATA NODE ADDRESS | INDEX NODE ADDRESS | FETCH NODE ADDRESS | PORT MAP B | PORT MAP A | ERROR & STATUS | CONTROL |
|---|---|---|---|---|---|---|---|
| 0 | 27740000000 | 27777700600 | 17777700144 | 0 | 2 | 130 | 120 |
| 1 | 7740000000 | 7740010101 | 37777701362 | 200 | 2 | 104 | 161 |
| 2 | 27740000000 | 7740010101 | 17777701364 | 0 | 2 | 210 | 120 |
| 3 | 27740010101 | 7740010101 | 37777701366 | 200 | 2 | 110 | 130 |
| 4 | 7740010101 | 7740010101 | 27777701364 | 200 | 0 | 210 | 120 |
| 5 | 7740010101 | 7740010101 | 7777701362 | 0 | 0 | 204 | 120 |
| 6 | 7740010101 | 7740010101 | 7777701362 | 0 | 0 | 124 | 120 |
| 7 | 27740010101 | 27743777777 | 37777701366 | 200 | 2 | 124 | 130 |
| 10 | 7740010101 | 27743777777 | 17777701370 | 200 | 2 | 230 | 120 |
| 11 | 7740010101 | 27743777777 | 7777701366 | 0 | 0 | 230 | 120 |
| 12 | 7740010101 | 17743777777 | 27777701364 | 100 | 0 | 124 | 120 |
| 13 | 27743777777 | 17750000000 | 17777701370 | 4 | 2 | 24 | 120 |
| 14 | 27750000000 | 17740000000 | 37777701372 | 100 | 2 | 230 | 120 |
| 15 | 27740000000 | 27753777777 | 27777701374 | 0 | 0 | 10 | 120 |
| 16 | 27740000000 | 27753777777 | 17777700140 | 0 | 2 | 124 | 120 |
| 17 | 27740000000 | 27753777777 | 37777700142 | 0 | 2 | 130 | 120 |

*FIG. 19*

| DMA BUS ADDRESS QUEUE DATA LAYOUT ||
|---|---|
| BITS | DEFINITION |
| 29 - 00 | SAVED DMA BUS ADDRESS QUEUE ENTRY |
| 30 | IF SET, ACCESS TYPE WAS "READ" |
| 31 | SAVED PARITY ON LINES RUNNING FROM DMA MANAGER 712 TO BUS NODE ARBITER 704 |

FIG. 20

| DMA CONTROL QUEUE DATA LAYOUT ||
|---|---|
| BITS | DEFINITION |
| 00 | STATE OF WRITE LINE FROM DMA MANAGER 712 TO BUS NODE ARBITER 704 |
| 01 | STATE OF MAINTENANCE LINE FROM DMA MANAGER 712 TO BUS NODE ARBITER 704 |
| 02 | STATE OF CONTROL LINE FROM DMA MANAGER 712 TO BUS NODE ARBITER 704 |
| 03 | IF SET, DMA MANAGER 712 REQUESTED TO PASS ONE WORD THROUGH BUS NODE ARBITER 704; IF CLEAR, DMA MANAGER 712 REQUESTED TO PASS A BLOCK OF WORDS THROUGH BUS NODE ARBITER 704 |

FIG. 21

| DMA PORT MAPPING QUEUE DATA LAYOUT ||
|---|---|
| BITS | DEFINITION |
| 02 | STATE OF WRITE-DATA-PARITY-FAILURE SIGNAL FROM MEMORY 706 FOR ACCESSES FROM DMA MANAGER 712 |
| 03 | STATE OF ALL-SEEMS-WELL-FAILURE SIGNAL FROM MEMORY 706 FOR ACCESSES FROM DMA MANAGER 712 |
| 04 | STATE OF ALL-SEEMS-WELL SIGNAL FROM MEMORY 706 FOR ACCESSES FROM DMA MANAGER 712 |
| 05 | IF SET, DMA MANAGER 712 RAISED INTERRUPT TO CPU PIPELINE 718 INDICATING FAULT IN DMA MANAGER 712 |
| 06 | IF SET, CALL STORE 710 ACCESS FROM DMA MANAGER 712 |
| 07 | IF SET, PROGRAM STORE 708 ACCESS FROM DMA MANAGER 712 |

*FIG. 22*

| ENTRY | DATA NODE ADDRESS | INDEX NODE ADDRESS | FETCH NODE ADDRESS | PORT MAP B | PORT MAP A | ERROR & STATUS | CONTROL |
|---|---|---|---|---|---|---|---|
| 0 | 7777777743 | 20004652154 | 27777701644 | 20 | 0 | 0 | 161 |
| 1 | 7777777743 | 20004652154 | 27777701644 | 20 | 0 | 0 | 161 |
| 2 | 7777777743 | 20004652154 | 27777701644 | 20 | 0 | 0 | 161 |
| 3 | 27777777743 | 27777774777 | 37777701646 | 21 | 2 | 0 | 120 |
| 4 | 27777777743 | 17744652154 | 17777701650 | 120 | 2 | 10 | 120 |
| 5 | 27744652154 | 7740000611 | 37777701652 | 0 | 2 | 210 | 120 |
| 6 | 7740000611 | 27740000000 | 7777701652 | 0 | 0 | 30 | 120 |
| 7 | 27740000611 | 27740000000 | 7777701652 | 200 | 0 | 20 | 161 |
| 10 | 7740000611 | 27740000000 | 17777700140 | 0 | 2 | 200 | 120 |
| 11 | 7740000611 | 27740000000 | 37777700142 | 0 | 2 | 10 | 120 |
| 12 | 7740000611 | 27777701710 | 17777700144 | 0 | 2 | 10 | 120 |
| 13 | 7777777741 | 27777774777 | 37777701642 | 21 | 2 | 10 | 120 |
| 14 | 7777777741 | 27777777743 | 17777701644 | 21 | 2 | 10 | 120 |
| 15 | 7777777743 | 20004652154 | 37777701646 | 20 | 2 | 10 | 161 |
| 16 | 7777777743 | 20004652154 | 7777701646 | 20 | 0 | 10 | 161 |
| 17 | 7777777743 | 20004652154 | 27777701644 | 20 | 0 | 0 | 161 |

*FIG. 23*

| ENTRY | DMA BUS ADDRESS | DMA PORT MAP | DMA CONTROL |
|---|---|---|---|
| 0 | 27777777777 | 0 | 0 |
| 1 | 27777777777 | 0 | 0 |
| 2 | 27777777777 | 0 | 0 |
| 3 | 27777777777 | 0 | 0 |
| 4 | 27777777777 | 0 | 0 |
| 5 | 27777777777 | 0 | 0 |
| 6 | 27777777777 | 0 | 0 |
| 7 | 27777777777 | 0 | 0 |
| 10 | 17740000611 | 0 | 10 |
| 11 | 17740000611 | 0 | 10 |
| 12 | 17740000611 | 100 | 10 |
| 13 | 37740000611 | 20 | 0 |
| 14 | 27777777777 | 0 | 0 |
| 15 | 27777777777 | 0 | 0 |
| 16 | 27777777777 | 0 | 0 |
| 17 | 27777777777 | 0 | 0 |

*FIG. 24*

SYSTEM AND METHOD FOR RECORDING SUFFICIENT DATA FROM PARALLEL EXECUTION STAGES IN A CENTRAL PROCESSING UNIT FOR COMPLETE FAULT RECOVERY

This application is a continuation of application Ser. No. 08/364,155, filed on Dec. 27, 1994, now abandoned.

TECHNICAL FIELD

This invention relates to the field of fault recovery of computer central processing units, and, more specifically to fault recovery of parallel execution stages of such central processing units.

BACKGROUND OF THE INVENTION

Reliability of computer systems is a critical issue in such fields as telephone switching offices, air traffic control, nuclear power plants, and the like. The central processing unit (or "CPU", as it is known in the art) must be highly reliable in these applications; one "fault" or error in the instruction execution stream can cause damage far beyond the troubles that such faults cause in, for example, personal computers. Therefore, such applications require CPU's with fault recovery systems that can recover to a known state when faults occur.

Current fault recovery techniques assume a single execution stage CPU, that is, a CPU that executes one instruction at a time. FIG. 1 illustrates the typical instruction flow in a single execution stage CPU. In a single execution stage CPU, instruction N is executed during time period X. Next, instruction N+1 is executed during time period X+1. Instruction N+2 is executed during time period X+2, etc.

FIG. 2 illustrates how this serial instruction stream is interrupted by the occurrence of a fault, and by subsequent fault recovery operation. During execution of instruction N, a fault occurs at time Y. Upon recognition of the fault, the CPU executes its fault recovery operation as the next operation. When the fault recovery operation is completed, instruction N is executed again in time period X+2, and then instruction N+1 in time period X+3, and so forth.

One assumption that is made in the above scenario is that this single execution stage CPU is capable of minimal fault detection and isolation latency such that propagation of collateral damage resulting from the fault is also assumed to be minimized, and further that the execution of instruction N+1 is assumed to be postponed until the successful execution of instruction N. One technique used in the art is to have a log that records the operations and effects of the instruction stream as the instruction are being executed in the CPU. The fault log thus captures the state of the CPU while it was executing the instruction that incurred the fault. The fault log information is then used by the fault recovery operations to reconstruct deterministically the flow of execution that lead up to the fault.

A further assumption made in single stage CPU, and illustrated in FIG. 3, is that faults appearing in different parts of the instruction stream are separated by time and are thereby independent; thus, each fault can be safely dealt with separately. This is illustrated in FIG. 3 by the execution of instruction N during time period X. A first fault occurs at time Y. The fault recovery operation occurs during time period X+1. Instruction N is then repeated, and then instruction N+1 is executed. During the execution of instruction N+1, a second fault occurs at time Z. The second fault recovery operation occurs during time period X+4. Instruction N+1 is then repeated, and then instruction N+2 is executed during time period X+6. Thus, the requirement of minimal detection and isolation latency applies equally to each independent fault in each time-separated stage of execution. Likewise, each invocation of the fault recovery operation can safely assume that the single fault log has recorded the state of the CPU for each of the time-separated, independent faults. The fault recovery operation follows the same procedure to reconstruct deterministically the flow of execution that lead up to each of these faults.

A further requirement of computer systems used in telephony, power plants, etc., is speed. More and more critical tasks are being performed on such computer systems; thus requiring faster and more powerful CPU's. One solution to the speed problem is to use parallel processing CPU's which can perform several operations on the instruction stream simultaneously. FIG. 4 illustrates the instruction flow in a CPU that supports multiple instructions in multiple execution stages during an overlapping time interval (known in the art as "pipelined"). In actual work accomplished, the operations executed in FIG. 4 is equivalent to the operations executed in FIG. 1. However, the elapsed time necessary to complete the tasks is reduced. FIG. 4 illustrates that, when instruction N finishes its execution in the first stage, it advances to the second execution stage and releases the first execution stage for use by instruction N+1. While the instructions are not complete until all tasks assigned to the instruction are complete, the instruction's occupancy of an execution stage is terminated when the task performed by that stage is completed. A stage that has completed its task is then available for the next instruction. Thus, each stage may operate on a different instruction simultaneously.

Fault recovery of a pipelined CPU is more complex, because the execution of instruction N+1 (and perhaps even N+2) may or may not be postponed by the occurrence of a fault in instruction N. This scenario is illustrated in FIG. 5. If instruction N encounters a fault at time Y, and then executes the fault recovery operation, and further if instructions N+1 and N+2 are not postponed by this fault, then there is the strong possibility that instructions N+1 and/or N+2 (or later instructions) hide the damage caused by the fault in instruction N, because damaged data from instruction N is likely to be used in instruction N+1 and/or N+2. Further, it is also possible that these later instructions may also have faults of their own.

In FIG. 5, which is an illustration of the current art, fault recovery operations reconstruct the flow of instructions N leading up to the first fault, but not the states of the instructions following this fault and prior to the actual execution of the fault recovery operation itself. Thus, a significant amount of collateral damage may be missed. Such an approach is taken because it is assumed that damage following the initial fault and prior to the actual execution of the fault recovery operation are coincidental and of low frequency. This assumption also implies that if collateral damage is severe enough that it may lead to system-affecting incidents, it will be detected and corrected by more drastic fault recovery steps when and if such collateral damage occurs. Such fault recovery is not acceptable for multiple execution stages in mission-critical applications, such as those listed above.

Therefore, a problem in the art is that there is no CPU that can provide both the speed of multiple execution stages and the security of complete fault recovery found in single execution stage systems of the prior art.

SUMMARY OF THE INVENTION

This problem is solved and a technical advance is achieved in the art by a system and method that can deterministically reconstruct the instruction stream of a multiple execution stage ("pipelined") processor because a plurality of queues (logs) are used to record completely the states of all of the diverse elements of a pipelined processor. Recognizing that one log is inadequate to reconstruct the totality of the states of all of the multiple executions stages, a queue (log) is provided for each critical data item to record the instructions, operations and effects as processing proceeds. A computer system, according to an exemplary embodiment of this invention, comprises a pipelined CPU, a memory and a DMA manager. A bus node arbiter coordinates memory access requests between the pipelined CPU and the DMA manager. The pipelined CPU maintains a plurality of queues in order to record the instructions, operations and effects of the various stages in the CPU. The bus node arbiter maintains a plurality of queues in order to record addresses, control and error information regarding CPU and DMA accesses of the various ports of the memory.

Also, rather than merely freezing the execution of a specific CPU stage upon occurrence of a fault in that stage, as is implied from having multiple queues, all CPU stages and DMA accesses are stopped so that the queue information is not over written that may be needed to reconstruct the instruction flow immediately preceding the invocation of any fault recovery operation. The fault recovery operation may then serially reconstructs the instruction flow, advantageously starting with the instruction where the fault occurred, working to reconstruct from that instruction to the last instruction that was executing before the fault recovery operation began. In this manner, the state of the system may be reconstructed and multiple stage processing restarted, without having corrupted data propagating throughout processing.

BRIEF DESCRIPTION OF THE DRAWINGS

A more complete understanding of the invention may be obtained from a consideration of the following description in conjunction with the drawings, in which:

FIG. 7 is a chart of the possible state transitions of instructions in the pipeline central processing unit according to FIG. 6;

FIG. 8 is a chart of the data layout for the saved data address queue of FIG. 6;

FIG. 9 is a chart of the data layout for the current address queue of FIG. 6;

FIG. 10 is a chart of the data layout for the execution pipeline history queue of FIG. 6;

FIG. 11 is an example of data collected in saved current address, saved data address, executive pipeline history, pointer and state queues of FIG. 6;

FIG. 12 is a chart of valid state transitions as recorded in the state queue of FIG. 6;

FIG. 13 is a chart of the data layout for the data node address queue of FIG. 6;

FIG. 14 is a chart of the data layout for the index node address queue of FIG. 6;

FIG. 15 is a chart of the data layout for the fetch node address queue of FIG. 6;

FIG. 16 is a chart of the data layout for the port mapping queue of FIG. 6;

FIG. 17 is a chart of the data layout for the control queue of FIG. 6;

FIG. 18 is a chart of the data layout for the error and status queue of FIG. 6;

FIG. 19 is an example of data collected in the data node address, index node address, fetch node address, port mapping, error and status, and control queues of FIG. 6;

FIG. 20 is a chart of the data layout for the DMA bus address queue of FIG. 6;

FIG. 21 is a chart of the data layout for the DMA control queue of FIG. 6;

FIG. 22 is a chart of the data layout for the DMA port mapping queue of FIG. 6; and FIG. 23 and 24 illustrate the interaction of the various queues in a fault scenario.

DETAILED DESCRIPTION

Figure 1:
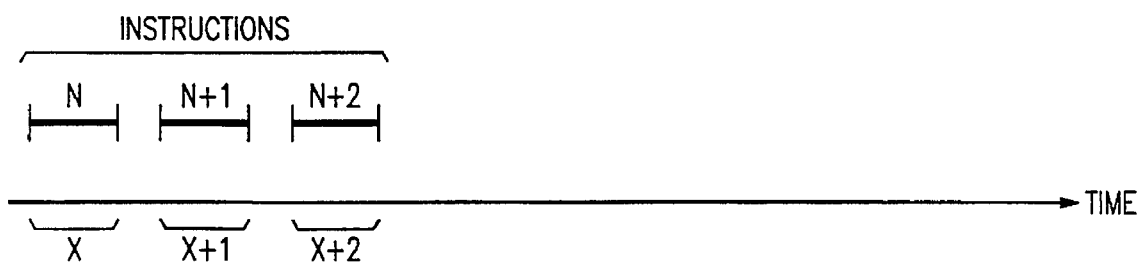
FIG. 1 is an illustration of a serial instruction stream in a single execution stage central processing unit.
Figure 2:
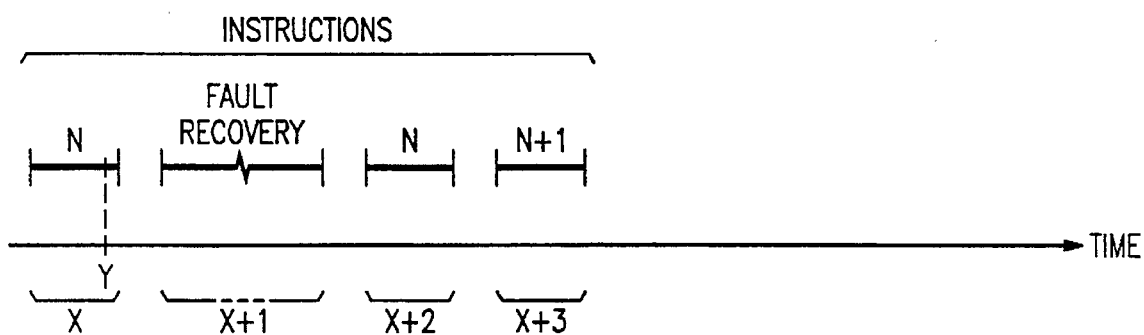
FIG. 2 is an illustration of a fault and fault recovery in the single execution stage central processing unit of FIG. 1.
Figure 3:
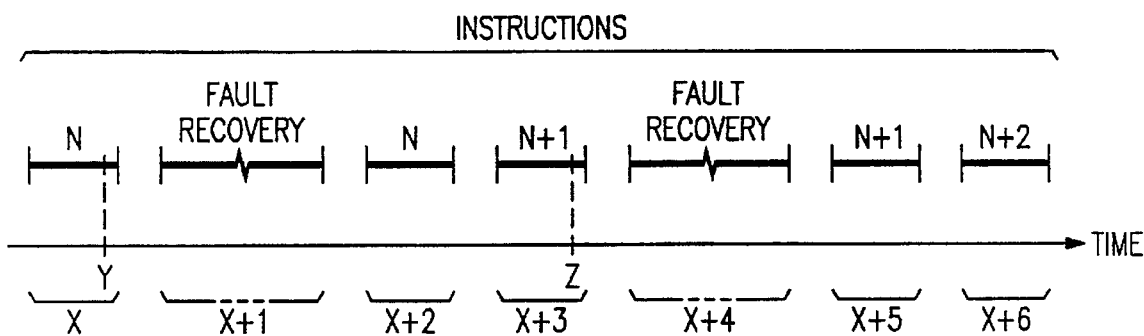
FIG. 3 is an illustration of multiple faults and fault recovery in the single execution stage central processing unit of FIG. 1.
Figure 4:
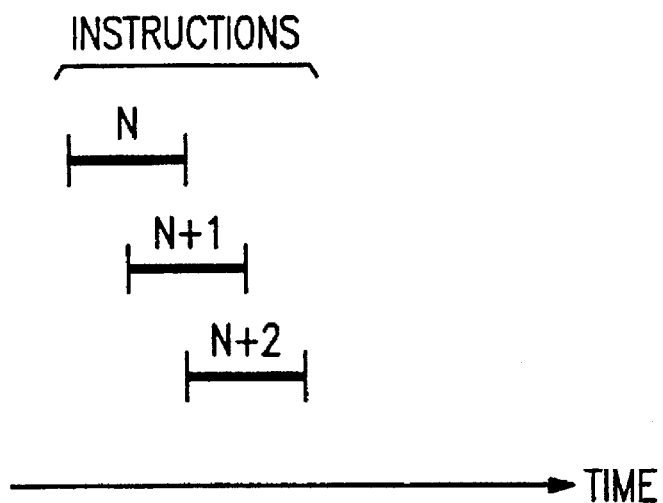
FIG. 4 is an illustration of a serial instruction stream in a multiple execution stage central processing unit.
Figure 5:
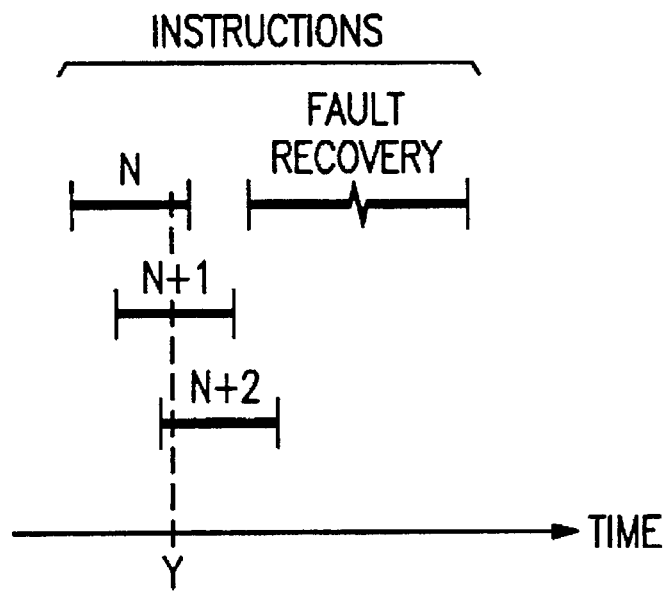
FIG. 5 is an illustration of a fault and fault recovery of a multiple execution stage central processing unit of FIG. 4 according to the prior art.
Figure 6:
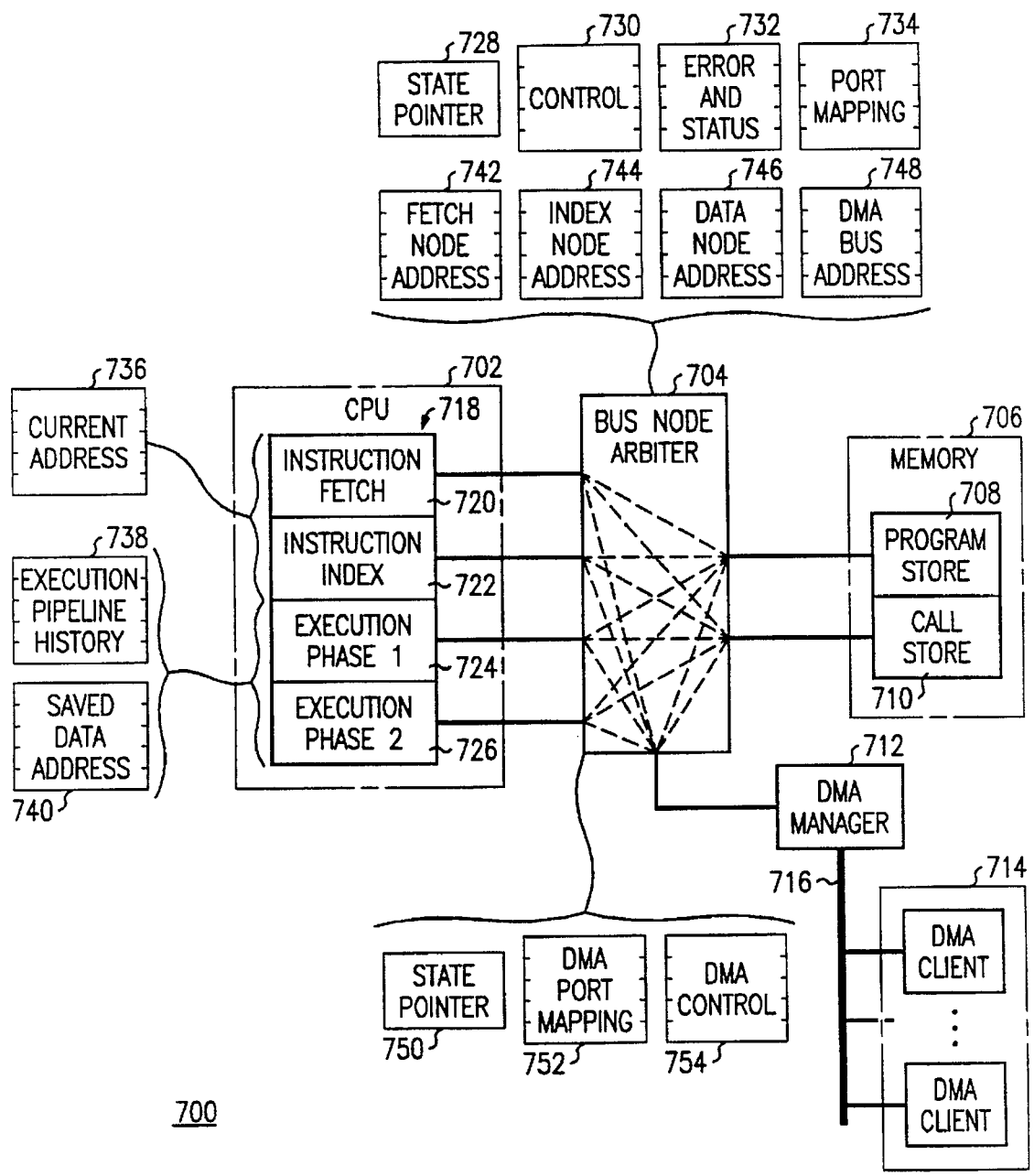
FIG. 6 is a block diagram of a multiple execution stage ("pipeline") central processing unit according to an exemplary embodiment of this invention.

Turning now to FIG. 6, a block diagram of a computer system 700 is shown, illustrating an exemplary embodiment of this invention. Computer system 700 comprises a CPU 702, a bus node arbiter 704, memory 706, and DMA manager 712. Memory 706 generally comprises program store 708 and call store 710, with a plurality of access nodes or ports (i.e., a fetch node, an index node and a data node). Program store 708 stores programs used by CPU 702 in performing its tasks, and call store 710 stores other data used for processing.

Bus node arbiter 704 is also functionally connected to a DMA manager 712, which is, in turn, connected to a plurality of DMA clients 714 via DMA bus 716. DMA manager 712 connects DMA clients 714 through bus node arbiter 704 directly into program store 708 and call store 710 memory, bypassing CPU 702. Bus node arbiter 704 provides interconnection among the various users of memory 706 and the memory itself. Bus node arbiter 704 controls access to memory 706 so that only one user at a time may access one memory location, thus avoiding multiple reads/writes to the same location at the same time.

CPU 702 comprises a pipelined processor 718. In this exemplary embodiment, pipelined processor 718 includes four stages. The first stage is the instruction fetch stage 720 which causes the next instruction to be retrieved from program store 708. The next stage in pipeline 718 is the instruction index stage 722, which decodes the fetched instruction, completes all indexing-related operations, and schedules execution operations for execution phase 1 724 and/or execution phase 2 726. Either or both execution phase 1 724 and execution phase 2 726 complete any remaining portions of the instruction depending upon the availability of the phase (whether it has completed its previous instruction) and the function of the phase. Execution phase 1 724 performs memory reads. Instructions can skip execution phase 1 724 if execution phase 2 726 is available. If execution phase 2 726 is occupied when an instruction leaves instruction index stage 722, then the instruction may proceed to execution phase 1 724 and perform any memory reads necessary. Execution phase 2 726 performs all other execution tasks, including but not limited to memory writes.

Since all stages of pipelined processor 718 may read and/or write memory 706, each stage may affect bus node arbiter 704. Further, DMA manager 712 also affects bus node arbiter 704 by reading and writing memory 706. A fault in either pipeline processor 718 or DMA manager 712 affects the other, and thus the entire computer 700. Therefore, a system is needed which can recreate the states of the pipeline processor 718, bus node arbiter 704, memory 706 and the DMA manager 712, if there is a fault in any one of those three.

To this end, a plurality of circular queues (728–756) are maintained, each one recording a different piece of information that is necessary for returning computer system 700 to a known state. Each queue has sixteen entries in this exemplary embodiment, except for the queues for DMA manager 712, which will be discussed further below. Current address queue 736 records the address of the instruction as it passes from instruction indexing stage 722 to execution phase 1 724 or to execution phase 2 726. Execution pipeline history queue 734 records the pipeline state transitions, such as instruction transitions from execution phase 1 724 to execution phase 2 726. Saved data address queue 740 records the data address of memory accesses made by execution phase 1 724, or execution phase 2 726.

Bus node arbiter 704 keeps nine queues, according to the exemplary embodiment of this invention. Fetch node address queue 742 records the memory address requests of instruction fetch stage 720. Index node address queue 744 records the memory address requests of instruction index stage 722. Data node address queue 746 records the memory address requests of either execution phase 1 724 or execution phase 2 726. DMA bus address queue 748 records the memory address requests of DMA manager 712. Port mapping queue 734 records the grants issued by bus node arbiter 704 to memory requests issued by any of the stages in pipeline 718. DMA port mapping queue 752 records the grants issued by bus node arbiter 704 to memory requests issued by DMA manager 712 and includes the state of status lines from bus node arbiter 704 to DMA manager 712.

Control queue 730 records the state of control lines passing from CPU pipeline 718 to bus node arbiter 704. Error and status queue 732 records the state of status lines running from bus node arbiter 704 to pipeline 718. DMA control queue 754 records the state of control lines passing from DMA manger 712 to bus node arbiter 704. State pointer 728 keeps track of the current entry for fetch node address queue 742, index node address queue 744, data node address queue 746, control queue 730, error and status queue 732 and port mapping queue 734. DMA state pointer queue 750 keeps track of the current entry for DMA bus address queue 748, DMA port mapping queue 752 and DMA control queue 754.

Pipeline processor 718 collects data in two primary stages. Each time an instruction leaves the indexing stage 722 of execution, the current instruction address is saved in current address queue 736. Whenever a significant pipeline event occurs, an entry is written into both the execution pipeline history queue 738 and save data address queue 740. The execution pipeline history entry comprises information that describes the pipeline events and the save data address queue 740 entry is the current content of the current data address.

When a fault occurs, as will be described more fully below, this data collection mechanism continues until all of the "in progress" memory accesses are complete. The data collection mechanism then stops, freezing the contents of the current address 736, execution pipeline history 738, and save data address 740 queues, thus saving the state of instructions that preceded the interrupt.

Turning now to FIG. 7, the possible state transitions as recorded in execution pipeline history queue 738 are shown. The execution pipeline history queue 738 contains four bits of information, which can describe all possible events in pipeline processor 718. Bit 3 indicates that execution phase 1 724 contained an instruction during the cycle just completed. Bit 2 indicates that execution phase 2 726 is the destination of an instruction that has just completed one of the other CPU pipeline 718 stages. Bit 1 indicates that execution phase 1 724 will be loaded from the instruction in indexing stage 722 and bit 0 indicates that execution phase 2 726 will be loaded from the instruction in indexing stage 722. These four bits represent the pipeline state that occurred on that specific clock cycle. These four bits can be combined sixteen different ways (that is values from 0 to 017 octal). For example, a state of 005 means that bits 0 and 2 were set, which is interpreted to mean that the instruction has completed its task in instruction index 722 and is enabled to enter execution phase 2 726 (all values are in Octal unless otherwise indicated).

State 000 means that nothing happened in the pipeline during this cycle. The pipeline may either be empty or an instruction may be stalled in execution phase 2 726 (FIG. 6). Alternatively, the instruction in indexing stage 722 could be blocked waiting for another instruction to clear, or instruction fetch stage 720 could be waiting to provide an instruction for indexing 722. State 002 is also a valid state, wherein the instruction in the indexing stage 722 was loaded into execution phase 1 724, and execution phase 2 726 is not available. In state 004, the instruction in execution phase 2 726 has completed, but there is no instruction in either execution phase 1 724 or indexing 722 to execute, so the "empty" word is moved into execution phase 2 726.

In valid state 007, the instruction in indexing stage 722 requires both execution phase 1 724 and execution phase 2 726, so it is loaded into both stages. In valid state 010, no action occurred in the pipeline because there is an instruction in both execution phase 1 724 and execution phase 2 726, but the instruction in execution phase 2 726 has not been completed. In valid state 014, the instruction in execution phase 2 726 is complete. Therefore, the instruction in execution phase 1 724 moves to execution phase 2 726. However, no instruction was ready to leave indexing phase 722, therefore, the "empty" word is loaded into execution phase 1 724. Finally, in valid state 016, the instruction in execution phase 2 is complete; therefore, the instruction in execution phase 1 724 moves to execution phase 2 726, and the instruction in indexing phase 722 is loaded into execution phase 1 724.

Turning now to FIGS. 8, 9 and 10, data layouts for the three queues associated with pipeline processor 718 are shown. FIG. 8 illustrates the data layout for the saved data address queue. Bits 29 through 00 are the memory address. The last two bits (31 and 30) show the type of operation at that address. 00 is a pulse or stack operation, 01 is a read operation, 10 is a write operation and 11 is a diagnostic loop around operation. FIG. 9 illustrates the data layout for the current address queue. Bits 29–00 are the saved current address. Bit 30, if set, indicates that the instruction is to be moved into execution phase 2, and bit 31, if set, indicates that the current instruction is to be moved into execution phase 1. FIG. 10 illustrates the data layout for the execution pipeline history. Bit 0, if set, indicates that the instruction in indexing will move to the execution phase 1. If bit 1 is set, the instruction in indexing will move to execution phase 2. If bit 2 is set, the instruction in execution phase 1 will move into execution phase 2. If bit 3 is set, execution phase 1 contains a valid instruction. Bits 15–08 are the saved value of the current address queue pointer from the time of the fault (if any) and bits 23–16 is the current value of the current address queue pointer.

In general, the execution pipeline history queue 738 is the key to understanding the CPU instructions that were in progress at the time of the fault. In order to correlate the various queues, the instruction address in current address queue 736 is the key. Bus node arbiter queues 728–734, 742–748, and 750–754 are used to interpret memory accesses that were in progress due to DMA or CPU accesses. For example, if a data address is in saved data address queue 740, but not present in data node address queue 746, the bus request has not yet been issued for that CPU instruction's data transaction. However, if an address is present in both the saved data address queue 740 and data node address 746, the result of that instruction will be obtainable from error and status queue 732 and port mapping queue 734. On the other hand, if concurrent memory accesses were being made, the corresponding addresses exist in entries of four bus node arbiter queues. That is, a fetch from instruction memory may be in progress while a DMA into data memory is being made, blocking a memory grant from instruction and execution. This is apparent from having addresses in the fetch node address queue 742 and DMA bus address queue 748, but no corresponding entry in the data node address 746 or the index node address queue 744. If a failure occurs on a DMA data transfer, the exact failing addresses will be in the DMA bus address queue 748 and a corresponding entry will be in DMA port mapping queue 752 and DMA control queue 754.

Execution pipeline history queue 738, along with the bus node arbiter 704 queues allow the machine to be stopped after any processor cycle, and the exact state of the machine can be determined in terms of the execution and memory access stages of instruction, along with correlating information about asynchronous DMA operations to memory. Bits 31 and 30 of the current address queue 736 indicate which execution stage an instruction was loaded into when it completed its tasks in instruction index stage 722. Operation bits 31 and 30 of the saved data address queue 740 indicate that the type of memory operation to be performed by that instruction. Since instructions can complete their tasks in instruction index stage 722 and have no further need to enter either execution phase 1 724 and/or execution phase 2 726, current address queue 736 can fill with entries faster than either saved data address queue 740 or execution pipeline history 738, which only record entries if an instruction needs to enter either execution phase 1 724 and/or execution phase 2 726. As a consequence, the entries in current address queue 736, execution pipeline history queue 738 and saved data address queue 740 are correlated by two fields within each execution pipeline history queue 738 entry. Whenever a new entry is recorded within execution pipeline history queue 738, one of these fields returns the current queue pointer to the current address queue 736 while the other field contains the contents of that queue pointer at the time that this particular entry in execution pipeline history queue 738 was recorded. Returning the current queue pointer in one field and the recorded queue pointer in another field allow a calculation of the actual entry in current address queue 736 that is related to this entry in execution pipeline history queue 738.

FIG. 11 shows an example of the correlation of the current address queue 736, saved data address queue 740, execution pipeline history queue 738, the field (labeled "pointer") within each listed entry from execution pipeline history queue 738 which contains the recorded queue pointer (which points to its related entry in current address queue 736) and the STATE field within each listed entry from execution pipeline history queue 738 (which defines the state of instructions as they moved from instruction index stage 722 in CPU pipeline 718). The column labeled ENTRY identifies the octal value of state pointer 728 for the directly related entries in execution pipeline history queue 738. The first entry, 0, is the oldest entry. The next read produces the most recent entry, entry 17, then the next most recent (entry 16), etc. The entry number of the entry in current address queue 736 that is correlated with the entries in execution pipeline history queue 738 and saved data address queue 740 is determined by taking the value in the POINTER row and subtracting (using one's compliment arithmetic) the field within the same row's value for execution pipeline history queue 738 which has the returned value for the current (at the time that execution pipeline history queue 738 was itself being read) queue pointer to current address queue 736. The result is then divided by sixteen and the remainder of this division is the entry number of the corresponding entry for current address queue. In this example, entry 15 indicates that the "read" instruction of saved current address 77701365 has moved out of indexing into execution stage 1 (state 002, FIG. 7). Entry 16 indicates that the saved current address of 77701365 has moved from execution phase 1 to execution phase 2 (state 016, FIG. 7), and save current address 77701367 has moved from execution phase 1 to execution phase 2 and that the empty instruction has been moved into execution phase 1 (state 014, FIG. 7). From this, it can be interpreted that previous instruction (saved current address 77701365) has left execution phase 2 and is complete from the CPU 702's perspective.

Turning now to FIG. 12 a table is shown that illustrates, the valid state transitions of the "state" field of FIG. 11. An instruction is "complete" from the perspective of CPU 702, (that is out of execution phase 2 726, or in the case of an index only instruction, out of indexing 722), when the following state transitions occur. An instruction is complete if state 2 is followed by state 16 and then by either state 14 or 16, or if state 2 is followed by state 14, and then by any of state 4, 5, 6, or 16. If state 5 is the current state, then it must be followed by either state 4, 5, 7, 14, or 16. State 14 is valid if it transitions through state 2 to reach state 16. If state 7 is followed by state 14, then the state must be followed by state 4, 5, 7, or 16. If state 7 is followed by state 16, then there must be a state 14 or 16 for the instruction to be complete. If state 16 is followed by state 14, then it must be followed by state 4, 5, 7, or through state 2 to state 16 to be complete. If the instruction is in state 16, followed by another state 16, then it must be followed by state 14 or another state 16. An indexing-only instruction is complete when another instruction enters indexing (either state 2, 5, 7, 16, or another indexing-only instruction). Thus, the execution pipeline history 738, saved current address 736 and save data address 740 gives the complete CPU 702 in respect to instruction completion.

While in pipeline processor 718, an instruction may cause a memory read. After the instruction leaves the pipeline 718, a memory write may still be in progress. To determine the completion status of such reads and writes, data must be collected from the bus node arbiter 704. The bus node arbiter queues 742–748, 730–734 and 752–754 give the necessary information about the memory access stages of the instruction, execution and DMA activity. Memory accesses can be requested from the bus node arbiter 704 by sending an address to the memory nodes. For the fetch node, index node, data node or DMA node for each cycle, the address on each node is written to the corresponding queue and the state pointer is incremented. When a memory access completes, the result is written to error and status queue 732 or DMA map 752 at the current state pointer 728 and DMA state pointer 750 to record the result.

When an interrupt occurs, bus node arbiter 704 continues to update fetch node address queue 742, index node address queue 744, data node address queue 746, control queue 730, error and status queue 732 and port mapping queue 734 with two more entries for the ports connecting CPU pipeline 718 with bus node arbiter 704. These two entries are sufficient to allow memory cycles in progress from the stages in CPU pipeline 718 to complete and be recorded. Interrupts originating from faults with CPU pipeline 718 do not block DMA operations from DMA manager 712, which can perform a single block operation to 128 separate memory locations following a CPU pipeline 718 fault and before fault recovery operations can initiate. Interrupts originating from faults associated with DMA manager 712 can still allow up to six further memory words to be modified from the DMA port. For either case, the DMA bus address queue 748, DMA port mapping queue 752 and DMA control queue 754 are capable of receiving 144 entries after the point of interrupt in this exemplary embodiment to guarantee that the results of the entire DMA transfer will be recorded.

According to the exemplary embodiment of this invention, data collected in various queues comprises raw data: the values of hardware logic signals during bus node arbiter 704 operation. Thus, care must be taken when interpreting this raw data, in that data is only valid at certain times. FIGS. 13–18 illustrate the data layout of the various queues kept by bus node arbiter 704. FIG. 13 illustrates the data node address layout. For the data node address layout, bits 29–0 are the saved data node address. Bit 30 if set indicates that the access type is a read and bit 31 indicates the parity that was on the control line running from the CPU pipeline 718 to the bus node arbiter 704 for the data node. FIG. 14 illustrates the data layout for the index node address queue 744. Bits 29–0 are the saved index node address. Bit 30 if set indicates the access type is a mad and bit 31 indicates the parity on the line running from the CPU pipeline 718 to the bus node arbiter 704 for the index node. FIG. 15 illustrates the data layout for the fetch node address queue 742. All bits in this queue indicate the saved fetch node address.

FIG. 16 illustrates the data layout for the port mapping queue 734. Port mapping queue 734 is in two parts, part B and part A. In part B, bit 0, if set, indicates a maintenance register access from the index port. If bit 1 is set, it indicates that there is a program store access from the fetch port. If bit 2 is set, then there is a program store access from the index port, and if bit 3 is set, there is a program store access from the data port. If bit 4 is set, there is a maintenance register access from data port and if bit 5 is set, there was a call store access from the fetch port. If bit 6 is set, then there is a call store access from the index port and if bit 7 is set, there is a call store access from the data port. In port mapping queue part A, if bit 0 is set, there is an outgoing access to the DMA manager 712 and if bit 1 is set, there is a read only program store access from the fetch port. If bit 2 is set, then there is a read only program store access in the index port and finally if bit 3 is set, there is a read only program store access from the data port.

FIG. 17 shows the meaning of the bits of the control queue 730 data layout. Bit 0 indicates the state of the write line from the data port and bit 1 indicates the state of the maintenance line from the data port. Bit 2 indicates the state of the control line from the data port, bit 3 indicates the state of the pulse line from the data port, and bit 4 indicates the state of the control line from the index port. Bit 5 indicates the state of the request line from the data port and bit 7, if set, indicates that the data port was granted access by the bus node arbiter 704 to the DMA manager 712. FIG. 18 shows the error and status queue 732 data layout. If bit 0 is set, the data, index or fetch port requested address is considered out of range. If bit 1 is set, the fetch port detected bad parity on the received data. Bit 2 indicates the state of the all seems well failure signal from memory 706 for accesses from the fetch port. Bit 3 indicates the state of the all seems well signal from memory 706 for accesses from the fetch port. If bit 4 is set, the data port detected bad parity on received data. Bit 5 indicates the state of the write data parity failure from memory for accesses from the data port. Bit 6 indicates the state of the all-seems-well-failure signal from memory 706 for accesses from data from the data or index ports. Bit 7 indicates the state of the all-seems-well signal from memory 706 for accesses from data or the index port.

FIG. 19 represents a dump of bus node arbiter data. This table includes the values retrieved from data node address queue 746, index node address queue 744, and fetch node address queue 742. The labels PMAP B and PMAP A identify columns containing the values retrieved from port mapping queue 734. The table further includes the values retrieved from error and status queue 732 and the values retrieved from control queue 730. In order to evaluate the data, the values in the PMAP A and PMAP B columns must be examined first to determine if the values in the row of entries is valid. For example, in entry one, bit 7 of PMAP B (the values are in octal) indicates an access was granted between the data port in bus node arbiter 704 and memory 706 which show that the row contains a valid entry. The control value for the row has bit 0 set, while bit 30 of the data node address value for the row is clear. These two bits together indicate that the type of access between the data port and memory is a "write". Consequently, the value in the address portion of the data node address entry is the address of a location in memory 706 that was written through the agency of the data port of bus node arbiter 704. Due to a one-entry delay between the grant of an access and its response by memory 706, the value in error and status queue entry row 2 must be examined for the result of this reception. In this case, error and status queue entry in row 2 indicates that memory 706 did acknowledge the access with no errors. Due to a one-entry delay between the reception result and any potential write operation results, error and status queue entry row three must be examined for the result of the actual write. In this case, error and status queue entry row three indicates that while this write was being passed through bus node arbiter 704, a parallel request from instruction fetch 718 was being granted to a read-only portion of memory 706. This grant did not conflict with the parallel grant of the previous write since they were to separate resources in memory 706. Consequently, bus node arbiter 704 could honor both requests with grants. The value in the fetch node address queue column of entry row 1 indicates that the type of access was a "read" as opposed to a "write" operation.

Again, due to the single entry delays between access grant, grant reception, and operation result, the error and status queue entries in entry rows 2 and 3 are examined for the results of the progression of this fetch request and both entries in this case indicate successful completion.

The value of control queue row 7 indicates that start of a special "pulse" operation that requires twice as many cycles to complete as read or write operations. The address of this pulse operation is recorded in the data node address value for entry row 7. Since a pulse operation requires twice as many cycles to complete, the results will not appear until two entries after this initial record, i.e. entry row 11 (octal). The error and status queue value for this entry row indicate that this pulse operation was also successful. Entry 10 (octal), if considered by itself, shows an access of memory through the data port portion of bus node arbiter 704 but since bit 30 of the data node address value for this row is clear as is bit 0 of control entry, this entire row should be ignored.

Turning now to entry number 12 (octal), the value for PMAP B indicates an access of memory through the index port of bus node arbiter 704. The value in this entry row for index node address queue has bit 30 set, indicating a read operation by the index port. Entry number 13 (octal) contains the reaction of memory 706 to this access. Memory 706 does not acknowledge the access. This is evident by the fact that neither the all-seems-well (bit 7) nor the all-seems-well-failure (bit 6) bits are set in the error and status queue value in entry row 13 (octal). The originator of the index request, i.e. instruction index 722, is expecting a response form memory 706. When a response is not delivered, as in this example, the response bus is left in a high impedance condition which results in a response parity error being detected by instruction index 722. This is recorded in the final result of this index read operation in bit 4 of the value for error and status queue in entry row 14 (octal). Since the system does not stop immediately after an error, a new instruction is read from memory and recorded in the value for index node address queue in entry row 13. While this read has no error displayed in subsequent entry row values for error and status queue, the read following it in the index node address queue value for row entry 14 does display an error pattern similar to the one noted for the index node address queue value in row entry 12. By row 16, the values in fetch node display the addresses associated with fault recovery programs that are finally dispatched to handle the failing index operation that appeared in row 12.

Circular queues DMA port mapping queue 752, DMA control queue 754 and DMA bus address queue 748 allow 256 entries each. These queues are correlated with the remaining queues in bus node arbiter 704 by means of the values in state pointer 728 and DMA state pointer 750. After an interrupt, bus node arbiter 704 continues to collect a further 144 (decimal) entries for DMA port mapping queue 752, DMA control queue 754 and DMA bus address queue 748 past the point at which the remaining queues in 704 have stopped collecting entries. The value in DMA pointer 750 indicates where bus node arbiter 704 has stopped collecting entries for queues 752, 754, and 748. Subtracting (one's complement) 144 (decimal) from the value in DMA pointer 750, the lower eight bits of this difference points to the first entry in queues 752, 754, and 748 and correlates to the beginning entry in the other queues in bus node arbiter 704. In this way, the actions of DMA manager 712 can be correlated with the actions of CPU pipeline 718.

FIGS. 20–22 illustrate the data layout for DMA data kept by the bus node arbiter. FIG. 20 illustrates the data layout for the DMA bus address queue 748. Bits 29–0 is the saved DMA bus address. Bit 30 if set indicates the access type was a read. Bit 31 indicates the parity on the lines running from the DMA manager 712 to bus node arbiter 704. FIG. 21 illustrates the data layout for the DMA control queue 754. Bit 0 indicates the state of the write line from the DMA manager 712 to bus node arbiter 704 and bit 2 indicates the state of control line from DMA manager 712 to bus node arbiter 704. Bit 3 if set indicates that the DMA manager requested to pass one word through bus node arbiter 704. If bit 3 is clear, then the DMA manager 712 requested to pass a block of words through bus node arbiter 704. FIG. 22 illustrates the data layout for the DMA port mapping queue 752. Bit 2 indicates the state of the write data parity failure from memory 706 for accesses from DMA manager 712. Bit 3 indicates the state of the all seems well failure signal from memory 706 for accesses from DMA manager 712. Bit 4 indicates the state of the all seems well signal from memory 706 for accesses from DMA manager 712. Bit 5 if set indicates that the DMA manager sent an interrupt to the CPU pipeline 718 indicating a DMA manager 712 fault. If bit 6 is set, there was a call store access from DMA manager 712 and, if bit 7 is set, there is a program store 708 access from DMA manager 712.

FIG. 23 and FIG. 24 illustrate a fault scenario where the correlation between the various queues in bus node arbiter 704. In FIG. 23, the value for the fetch node address queue entry in row 10 (octal) is the starting address of a fault recovery program designed to recover from errors associated with call store component 710. This recovery program observes the values for PMAP B from the value in the state pointer forward (increasing order) in the circular queue to find an access associated with call store 710 that may be the reason for the start of the recovery program. The PMAP B entry in row 14 (octal) indicates an access of call store 710 from the index port. The error and status queue value in row 5 shows that call store 710 properly acknowledged this access and detected no error. Row 5 also shows this address moving from the index node address queue to the data node address queue. In Row 6, an indicator of an erroneous parity calculation on data received by the data node indicates that this address in data node address queue row 5 was the cause of the start of the fault recovery program. As a result, the fault recovery software then schedules recovery on the hardware in call store 710 that is associated with the address in data node address queue row 5.

In a computer composed of serially executing instructions (the prior art), this would complete the fault analysis portion of the fault recovery software. Within the exemplary system and method described here, this is the starting point. The fault recovery software continues scanning the remaining entries (up to the address indicating its own dispatch) to determine if extended recovery is required. The PMAP B indicator for entry row 7 (octal) also shows an access of the call store component 710 by the data node and both the data node address queue value and control queue value for this row indicates that the access type was a "write". The error and status queue values for the next row (10) indicate successful acknowledgment by the call store component 710 of this access by the data port. The error and status queue value for the final row (11) indicates that there was no error signaled by call store component 710 in actually performing this write. Although there is no error, a "write" occurring after an erroneous read could in fact be the result of writing the previously read data (with scrubbed parity) to a new location in call store 710. This leads to a robust recovery algorithm that must track down and isolate any and all possible propagation of the original error.

A robust recovery algorithm becomes even more justified when examining the behavior of DMA manager 712 before during and following the detection of the fault. FIG. 24 shows the values of DMA bus address, DMA control, and DMA port map queues, after the alignment calculation described earlier such that the row indices line up with those of FIG. 23. In this example, DMA manager 712, in entry row 10 (octal), requests to read call store component 710 just after the data node component has completed its write of what could be erroneous, and now "laundered", data. As can be seen by continuing further on in the rows of FIG. 24 (which is reduced from its usual 256 entries to those displayed in FIG. 24 in the interest of clarity), this read is eventually granted by bus node arbiter 704 (in entry 12) and successfully completed by call store memory 710, as indicted by the all-seems-well indication in entry 13. Rather than ignoring this serious propagation of erroneous data, fault recovery software extends its recovery action to include this read by DMA manager 712. Since no other faults or serious propagation behaviors are found in the remaining entries of the queues leading up to fault recovery dispatch, the analysis is completed and the actual recovery actions begun. These subsequent actions can now proceed as though for a machine with traditional sequential execution stages.

It is to be understood that the above-described embodiments are merely illustrative principles of the invention and that many variations may be devised by those skilled in the art without departing from the scope of the invention. It is, therefore, intended that such variations be included within the scope of the claims.

We claim:

1. A method for fault recovery for use in a computer system comprising a memory, a DMA manager, and a central processing unit having a plurality of stages of processing, said stages operating on a stream of instructions at the same time in a pipelined manner, said central processing unit having a plurality of CPU queues, each of said queues recording instructions, operations and effects, said computer system further including a bus node arbiter for coordinating memory accesses by said central processing unit and said DMA manager, said bus node arbiter having a plurality of queues, each of said bus node arbiter queues recording data regarding memory accesses, said method comprising the steps of:

encountering a fault in said computer system;

completing processing of all instructions and then halting processing in all stages of processing;

reconstructing said instruction stream in said CPU and said memory accesses using said instructions, operations and effects from said plurality of queues;

correlating said memory accesses from said CPU with memory accesses from said DMA manager such that all shared accesses to said memory are reconstructed from a finite period prior to said fault to the beginning of memory accesses for effecting fault recovery; and resuming processing in all of said plurality of stages with the instruction that had encountered the fault.

2. A fault recovery system for a central processing unit having a plurality of stages of processing, said stages operating on a stream of instructions at the same time in a pipelined manner, said system comprising:

a memory;

a DMA manager;

a central processing unit having a plurality of stages of processing, said stages operating on a stream of instructions at the same time in a pipelined manner, said central processing unit having a plurality of CPU queues, each of said queues recording instructions, operations and effects;

a bus node arbiter for coordinating memory accesses by said central processing unit and said DMA manager, said bus node arbiter having a plurality of queues, each of said bus node arbiter queues recording data regarding memory accesses; and fault recovery means responsive to detection of a fault in said central processing unit and said DMA manager for stopping processing after all currently active instructions are complete, serially reconstructing said instruction stream using said instructions, operations and effects present in said plurality of CPU queues, and serially reconstructing coordinated accesses to said memory in said computer system using data present in said plurality of bus node arbiter queues to repeat instructions in a pipelined manner that were being processed when the fault occurred.

3. A system for recovering from one or more faults in a pipeline central processing unit, said system comprising:

a pipeline processor having a plurality of stages of processing, said stages operating on a stream of instructions at the same time;

a memory with several memory ports;

a direct memory access (DMA) system;

a bus which connects said pipeline processor and said DMA system with said memory;

a bus node arbiter for coordinating memory accesses by said central processing unit and said DMA manager, said pipeline processor, said DMA system and said bus node arbiter each having a plurality of circular queues, each of said queues recording data regarding instructions, operations and effects of instructions and operations as they transpire; and fault recovery means responsive to detection of one or more faults in said system for permitting all instructions that are currently active in said pipeline processor and said DMA manager to complete, stopping processing, serially reconstructing said instruction stream using said instructions, operations and effects present in said plurality of queues, correlating said memory accesses from said CPU with memory accesses from said DMA manager such that all shared accesses to said memory are reconstructed from a finite period prior to said fault to the beginning of memory accesses for effecting fault recovery; and causing said computer system to repeat instructions that were being processed when said one or more faults occurred.

* * * * *